United States Patent [19]
Raimbault

[11] 3,834,791
[45] Sept. 10, 1974

[54] LIQUID CRYSTAL DISPLAY DEVICES AND METHODS OF MANUFACTURING SUCH DEVICES

[75] Inventor: Pierre Lucien Raimbault, Courbevoie, France

[73] Assignee: L.C.C.-C.I.C.E. Compagnie Europeenne de Composants, Montreuil-Sous-Bois, France

[22] Filed: May 29, 1973

[21] Appl. No.: 364,281

[52] U.S. Cl............................. 350/160 LC, 29/592
[51] Int. Cl................................................ G02f 1/16
[58] Field of Search................................... 350/160

[56] References Cited
UNITED STATES PATENTS
3,728,007  4/1973  Myrene et al. ............... 350/160 LC
3,744,878  7/1973  Kiemels et al. ............... 350/160 LC
3,751,137  8/1973  Fitzgibbons et al. .......... 350/160 LC
3,771,855  11/1973 Burns............................ 350/160 LC Primary Examiner—Edward S. Bauer
Attorney, Agent, or Firm—Edwin E. Greigg

[57] ABSTRACT

Improvements in or relating to liquid crystal display devices, to enable simple, efficient and economical manufacture of such devices.

Tongues cut from a metal strip whose thickness is equivalent to that of the desired liquid crystal film, and inserted between the plates and boarded by a seal delimiting such film, are responsible both for determining the spacing between said plates and for providing connection of the electrodes within and outside said plates.

The invention applies to the field of data display equipment.

3 Claims, 10 Drawing Figures

LIQUID CRYSTAL DISPLAY DEVICES AND METHODS OF MANUFACTURING SUCH DEVICES

The present invention relates to improvements in display devices in which the properties of certain organic bodies are exploited, these bodies being generally referred to as "liquid crystals".

Bodies of this kind, if of the "nematic" kind and in particular when in the "mesomorphous" phase, appear perfectly transparent when in the form of a thin film. Placed between two electrodes and in contact therewith, they exhibit marked diffusion when said electrodes are subjected to a potential difference. The result is that if the materials, of which the electrode substrates and the electrodes themselves, are made, are transparent, that part of the liquid crystal film in contact with the electrodes will, by transmission and/or reflection of the light, appear to offer much more contrast than the surrounding film, thus displaying the shape of the underlying electrode and consequently making it possible to distinguish this shape from those of the other electrodes. Thus, it is possible to display as many symbols as can be formed by the paired combination of electrodes located at either side of the liquid crystal film disposed between the two supports or substrates.

Devices of the kind described hereinbefore, thus make it possible in particular to create display panels in which each electrode beneath the liquid crystal film, considered individually, constitutes a symbol or, possibly, an element of a symbol which is to be displayed.

Devices of this kind are already known per se: it is a conventional technique to produce display panels by forming the liquid crystal film as a thin film produced by insertion of the liquid crystal into the space formed between two plates of an insulating material at least one of which is transparent, these plates being disposed parallel to one another at an interval corresponding to the desired film thickness and the periphery of the plates preferably being sealed by the peripheral provision of a seal of some suitable material or other. The optimum thickness of the liquid crystal film, is around 20 $\mu$m.

The means which have been proposed hitherto, for the building of devices of this kind, have turned out not to be completely efficient or to be difficult to apply, the cost of the display devices manufactured in this way being high. The improvements introduced in accordance with the invention, to the methods of constructing such devices, make it possible on the other hand to manufacture them simply, efficiently and economically.

The present invention consists, essentially, in: ensuring proper register of the two electrode substrate plates, by the insertion between the edges of said plates of tongues cut out of a metal strip whose thickness is equivalent to that of the liquid crystal film to be produced, said tongues extending beyond the contour of the plates in order to make it possible at the same time to effect electrical connection with external circuits. There are as many tongues as there are electrical connections linking the electrodes with the edges of the plates. These tongues can either be produced separately or, advantageously, can be produced simultaneously in one cutting operation, being linked with a frame or strip cut together with them in the aforesaid strip, the positions of the tongues corresponding to that of the electrical connections:

bonding together the assembly of said electrode substrates and said interposed tongues, in order to effect contact, within the periphery of said plates, with the electrical connections;

arranging, at the peripheries of said plates and in contact with said tongues, this by some suitable means or other, a seal made of a fusible insulating material which will weld simultaneously to the three materials of said plates and said metal strip, thus sealing off the enclosure defined hereinbefore;

providing communication between the interior and exterior of said enclosure, by the provision, through said seal, of at least one bore designed to balance the pressures during the production of the seal, and to subsequently make it possible to fill the enclosure;

cutting, in the event that the tongues are attached to a frame or to a strip of suitable profile, the assembly of tongues and thus, outside the periphery of the plates, producing output connections for the electrodes of the panel, in the form of those parts of said tongues which project beyond said contour.

The invention will be better understood, together with its features and advantages, from a consideration of the ensuing description and the attached drawing, both of which have been given purely by way of example without any limitation being intended. Two display devices produced in accordance with the invention, have been shown in the drawing: the first is a display panel comprising a certain number of symbols made up of elementary segments each of which constitutes an electrode of the device, the totality of which make it possible to display a certain number of letters and numbers; the second is an embodiment of an XY matrix unit, designed in the aforementioned fashion.

In the drawing:

FIGS. 1, 2, and 3 illustrate, in isometric views, the elements of a display device in accordance with the invention, ready for assembly;

Figure 1:
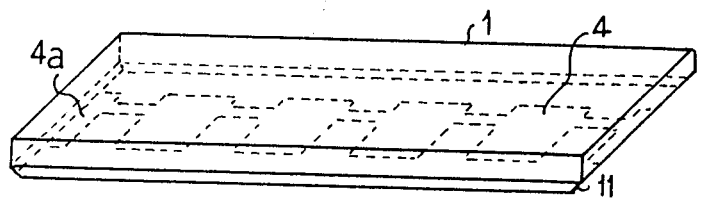

On the plate 1 shown in FIG. 1, there has been etched or deposited, by some suitable known method or other which is therefore beyond the scope of the present invention, a conductive matrix 4, possibly also transparent or reflective, all the elements of which, by way of non-limitative example, are interconnected with each other and with two opposite edges of the plate, at 4a.

Figure 2:
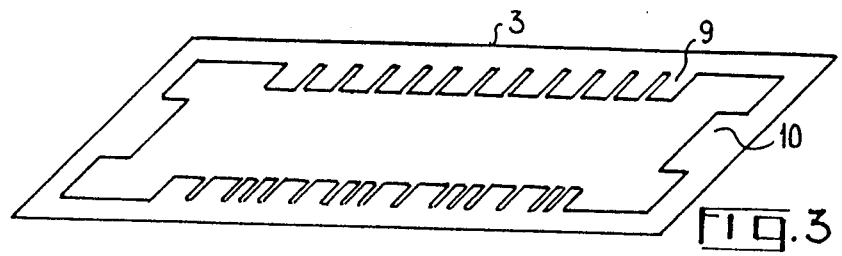

On the plate 2 of FIG. 2, which has the same size as the plate 1 and can therefore be superimposed on same, there has been etched or deposited, likewise by any known method, a conductive and transparent matrix 5, in the form of mutually independent segments which are electrically connected to two opposite edges of the plate, at 5a, which edges, when the two plates 1 and 2 are superimposed in the manner hereinafter described, correspond to the unetched edges of the plate 1.

The two plates 1 and 2 have a simple square or rectangular geometric form, as in the case for the two examples of liquid crystal display devices which form the subject of the illustrations of the invention, chosen here. It goes without saying that any other contours could be used in the said plates, without in so doing departing from the scope of the present invention.

Figure 3:
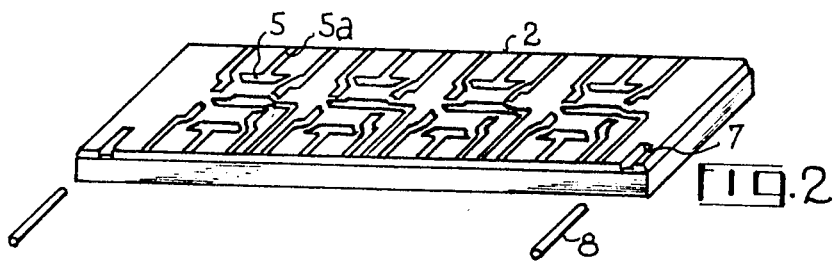

The frame 3 shown in FIG. 3 is cut from a metal strip having a thickness whose value is equivalent to the gap to be produced between the plates 1 and 2, namely the thickness of the desired liquid crystal film. The external contour of this frame has a simple shape, preferably corresponding to the contour of the two plates 1 and 2. Its internal contour comprises cut-outs in the form of strips or tongues such as those 9 and 10. These tongues are designed, in accordance with the invention, to form as many output connections as there are external electrical connections required between the elements of the matrices 4 and 5, carried by the plates 1 and 2, and the exterior of these plates.

Figure 4:
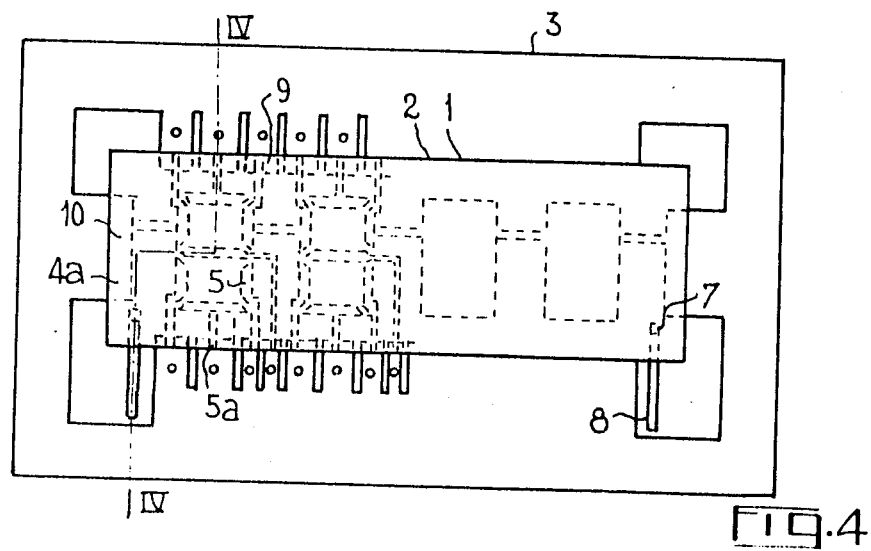
FIG. 4 illustrates a plan view of the device obtained by the assembly of the elements shown in the preceding figures.

Accordingly, the shape, dimensions and dispositions of the tongues 9 and 10, are such that they are respectively located opposite the connecting strips 4a and 5a which have been etched or deposited respectively on the plates 1 and 2 at the same time as the matrices 4 and 5, when the frame 3 is placed in a precisely registered position in relation to the plates 1 and 2, these latter themselves being disposed exactly opposite one another. It is possible, in particular, to ensure, by judicious arrangement of the tongues and the conductive zones of the two plates, that there is either individual external connection of each of the zones of one and the same plate, or simultaneous external connection of two mutually opposite zones, or again simple internal connection of such two mutually opposite zones. Under these conditions, by placing one upon the other of these three elements, the device shown in FIG. 4 is obtained. In this figure, we encounter marked by the same references, the various elements which have been indicated in FIGS. 1, 2 and 3, plus two tubes such as those marked 8, inserted in grooves 7 which have been previously formed in one of the plates 1 or 2, for example, as illustrated in FIG. 2 on the internal face of plate 2. These tubes 8 are designed to provide communication between the interior and the exterior of the cavity delimited by the two plates 1 and 2, the tongues, and the seal hereinafter defined.

It will be appreciated then, how advantageous this design of a stack of elements constituting the device in accordance with the invention, is: the plates 1 and 2, the tongues 9 and 10 and the tubes 8 are in other words assembled under conditions which are for accuracy, facility and saving of time in assembly, compared with the very large numbers of connections which such display devices may comprise.

These advantages are still further multiplied by the following features of the invention.

Figure 5:
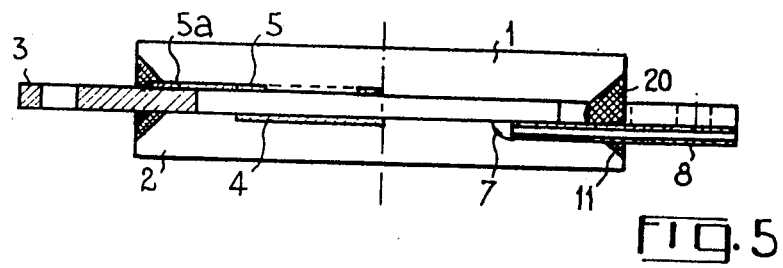
FIG. 5 is a transverse section, on the line IV—IV, of the device shown in FIG. 4.

A seal 20, of a tight and electrically insulating material, weldable both to the material of the two plates 1 and 2 and to the material of the frame 3, such as by way of example, a cement, a paste or a vitreous material, is deposited in the manner shown in FIG. 5, around the whole of the periphery of the plates 1 and 2, at either side of the tongues 9.

This insulating material is selected among those for which such a depositing is feasible by known techniques on one end, and which harden spontaneously on the other end easily or by means of a treatment which does not alter the performances of the device. Two chamfers 11 are formed on the external edges of said plates to facilitate said deposit, and at the same time to ensure the deposition of a larger quantity of bonding material, thus further improving the quantity of the seal 20 obtained. As the transverse section of FIG. 5 shows, the tubes 8, at either side of the seal 20, exhibit projecting portions which prevent the orifices of these tubes from being blocked by the bonding material.

It goes without saying that the application of the seal 20 can only be effected efficiently of all the constituent elements of the device in accordance with the invention, have previously been rigidly located in relation to one another. Any known clamping device for applying the plates 1 and 2 to the internal part of the frame 3, constituted by the tongues, will satisfy this requirement. As far as the introduction of the seal 20 is concerned, it will be appreciated that the material of which it is made must be sufficiently fluid in order to penetrate into the spaces present between tongues and thus likewise seal the device at these locations.

After the depositing of the bonding material, the device as shown in FIG. 5, removed or not from the clamping arrangement but, in either case, without any risk of its elements displaying in relation to each other, is allowed to harden, this operation bringing about the sealing off of all the gaps present at the periphery of the seal between the plates 1 and 2, the frame 3 and the tongues of the said frame, welding them together. The bond thus obtained seals off the enclosure completely. Communication with the exterior is provided through the tubes 8, a discharge opening 7a formed at the end of the grooves 7 in each of the plates carrying these tubes, preventing these tubes from opening on to walls which might close them off.

With plates made of glass, the bonding material is avantageously a vitreous material deposited on to the plates in the form of a paste and then melt at suitable temperature in a oven in order to insure sealing of the two plates with one another and with the metallic tongs projecting from the plates.

Figure 6:
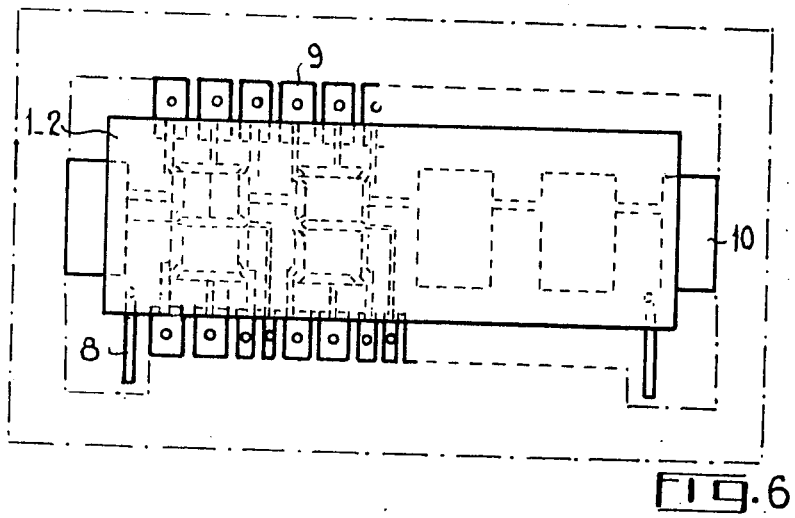
FIG. 6 is a plan view of the same device, but after the elimination by cutting, of the external part of the frame shown in FIG. 2.

In the case where a frame or strip is used, after cooling the device in accordance with the invention and as described hereinbefore, is placed on a cutting tool which, preferably in a single operation, trims off the tongues and gives them the desired profile at the same time, as FIG. 6, this figure being identical to FIG. 4 except as far as that part of the frame 3 is concerned, which, being eliminated by the trimming operation hereinbefore referred to, has been shown in broken-line.

Subsequently, the device thus obtained can readily be filled, for example by evacuating the enclosure through the tube or tubes 8 and then introducing the liquid crystal through a set of appropriate pipes and valves, connected to said tube or tubes, said pipes and valves being outside the scope of the present invention however.

Figure 7:
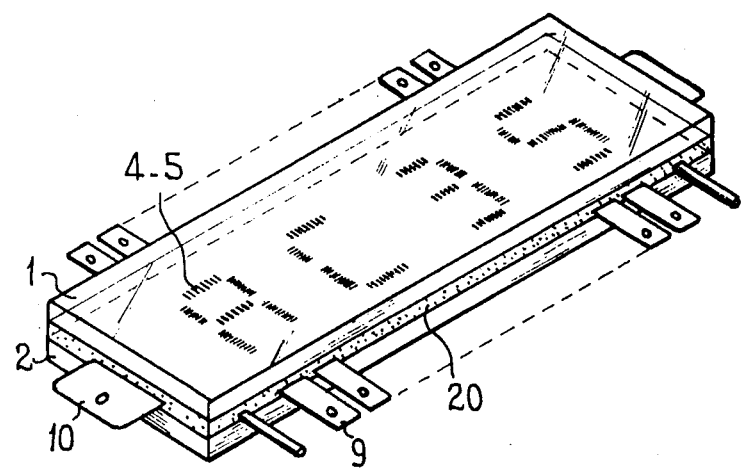
FIG. 7 is an isometric view of the finished device, constituting an alpha-numeric display panel.

The final closing of the enclosure can be carried out by closing off the tube or tubes by some suitable means or other. FIG. 7, in an isometric view, illustrates the final form of an alpha-numeric display panel produced in accordance with the present invention, the number of symbols to be displayed not of course being limited to that illustrated by the panel shown here, the latter having been given purely by way of example.

Moreover, this figure does not show, since it forms no part of the invention, the set of electrical connections for this kind of panel, but these can be connected to the tongues by any suitable method.

Figure 8:
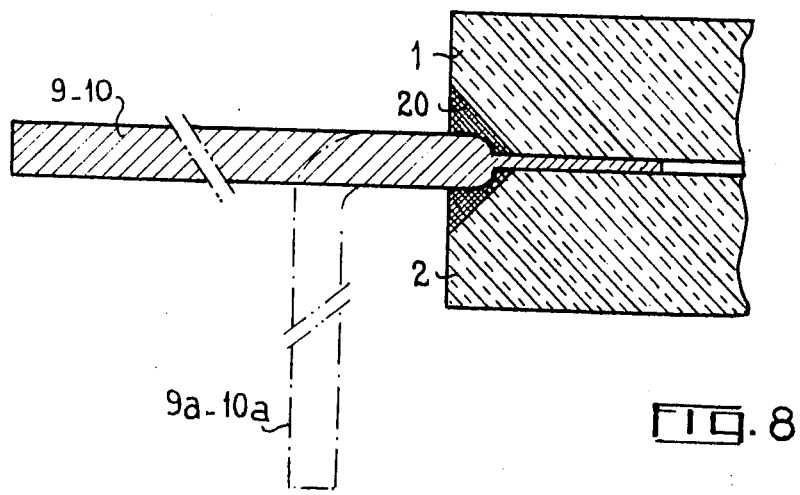
FIG. 8 is a partial transverse section of a varied embodiment of a detail of FIG. 5.

A variation can be introduced into the design of these tongues, the part inserted between the plates having the thickness determined by the requisite setting, the parts outside the plates having a greater thickness in order to make it possible to use the tongues as pins for insertion into a connector, the spacing and stiffness of these pins being determined by their encastre fixing in the seal, as shown in FIG. 8.

In this kind of arrangement, if the application requires it, tongues can advantageously be bent over in the manner shown in broken line at 9a–10a, in the figure.

Figure 9:
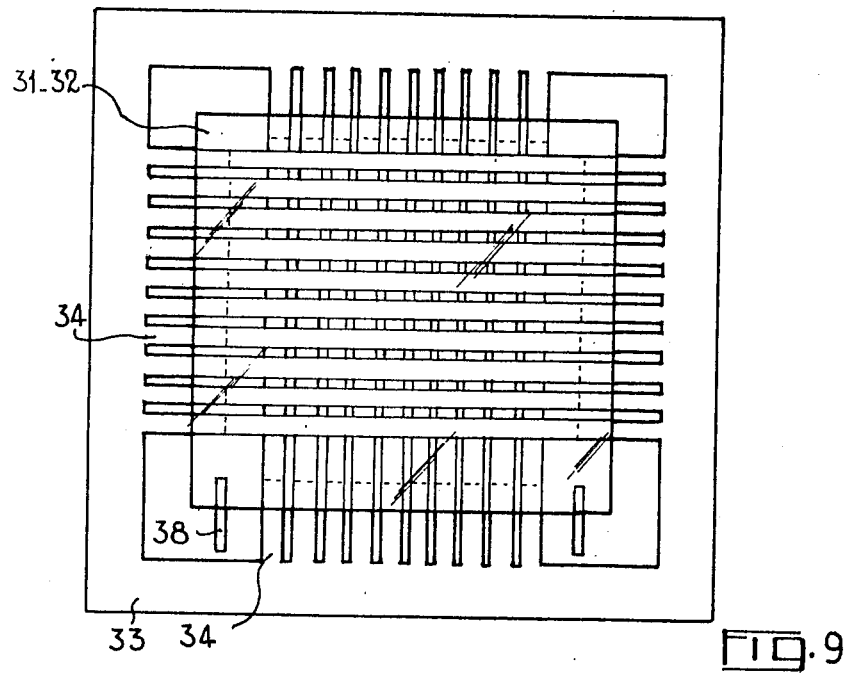
FIG. 9 is a plan view of a display device in accordance with the invention, shown here however in the form of an XY matrix unit.

The XY matrix unit shown in plan in FIG. 8, has the same kind of design as the alpha-numeric display panel of the preceding figures. In FIG. 9, the two matrices can be seen, disposed in rows and columns and each arranged upon a plate 31 and a plate 32 with, between them, the tongues 34 cut out in the interior of frame 33.

Figure 10:
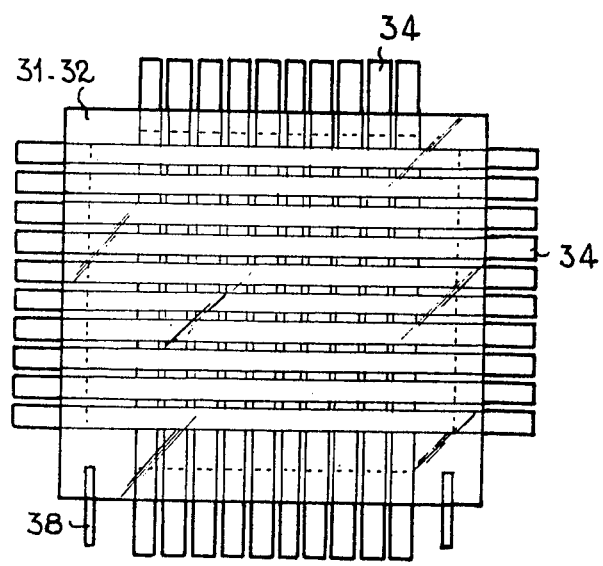
FIG. 10 is a plan view of the same unit after the removal, by cutting, of the external part of the initial frame.

FIG. 10 illustrates the same matrix after the frame has been trimmed externally and its external part eliminated, thus rendering each of the tongues fitted in position at each end of row and column, independent of the others. 38 indicates the tube or tubes for filling this matrix.

The advantages obtained by manufacturing the liquid crystal devices in accordance with the method of the invention, have been discussed during the preceding description. The materials suitable for use in the conditions outlined in the course of this description, and the choice of which makes it possible to produce chemically inert sealed enclosures, inert that is vis-a-vis the liquid crystal but at the same time compatible with the assembly methods employed, are within the scope of the person skilled in the art.

Of course, the invention is not limited to the embodiment described and shown which was given solely by way of example.

What is claimed is:

1. A liquid crystal display device in which the liquid crystal is entrapped in the form of a thin film between two parallel plates of insulating material, one of which at least is transparent, said plates being bonded together and carrying on their mutually opposite faces electrodes corresponding to the symbols which are to be displayed as well as conductors connecting each of said electrodes to the edges of the plates, characterized in that said device has a metal strip electrically connected to each of said conductors which extends beyond the edge of each of said plates, each of said strips contacting the internal periphery of each of said plates for spacing said plates, and an insulating seal for sealing said plates and for insulating each of said strips from each other.

2. A liquid crystal display device as claimed in claim 1, characterized in that at least one filler tube is arranged in a groove formed in the internal face of at least one of said plates.

3. A liquid crystal display device as claimed in claim 1, characterized in that those parts of said strips located externally of said plates, have a thickness greater than that of those parts of said tongues arranged between said plates, in order thus to do duty as connecting pins for insertion into a connector.

* * * * *